(12) United States Patent
Key

(10) Patent No.: US 10,975,932 B2
(45) Date of Patent: Apr. 13, 2021

(54) WEIGHT APPLICATOR HEAD PROVIDING IMPROVED WET OUT

(71) Applicant: Android Industries LLC, Auburn Hills, MI (US)

(72) Inventor: Jeffrey P. Key, Orion Township, MI (US)

(73) Assignee: Android Industries LLC, Auburn Hills, MI (US)

( * ) Notice: Subject to any disclaimer, the term of this patent is extended or adjusted under 35 U.S.C. 154(b) by 958 days.

(21) Appl. No.: 15/597,593

(22) Filed: May 17, 2017

(65) Prior Publication Data

US 2017/0335922 A1    Nov. 23, 2017

Related U.S. Application Data

(60) Provisional application No. 62/337,592, filed on May 17, 2016.

(51) Int. Cl.
| | |
|---|---|
| *G01M 1/32* | (2006.01) |
| *F16F 15/32* | (2006.01) |
| *F16F 15/34* | (2006.01) |
| *B29D 30/08* | (2006.01) |
| *F16F 15/36* | (2006.01) |
| *G01M 1/02* | (2006.01) |

(52) U.S. Cl.
CPC ............ *F16F 15/345* (2013.01); *B29D 30/08* (2013.01); *F16F 15/324* (2013.01); *G01M 1/326* (2013.01); *F16F 2226/042* (2013.01); *F16F 2230/0011* (2013.01)

(58) Field of Classification Search
CPC ...... F16F 15/324; F16F 15/328; F16F 15/345; G01M 1/326
See application file for complete search history.

(56) References Cited

U.S. PATENT DOCUMENTS 5,206,984 A * 5/1993 Matumoto ............. B23P 19/02
29/281.1
2010/0058859 A1    3/2010 Rogalla et al.
2010/0147458 A1    6/2010 Donnay et al.
(Continued)

FOREIGN PATENT DOCUMENTS

| CN | 104386162 A | 3/2015 |
|---|---|---|
| EP | 1225367 A1 | 7/2002 |

(Continued)

OTHER PUBLICATIONS

European Search Report for European Application No. 17800079.0 dated Dec. 18, 2019.
(Continued)

*Primary Examiner* — Herbert K Roberts
(74) *Attorney, Agent, or Firm* — Honigman LLP

(57) ABSTRACT

A weight applicator including a weight applicator head and at least one actuator is disclosed. The weight applicator head is adapted to carry a wheel balance weight and has a weight application surface with a weight retaining region and a leading rotation region. The at least one actuator is coupled to the weight applicator head for manipulating the weight applicator head in at least one direction. The at least one direction has a radial component. The leading rotation region is oriented to extend radially further than the weight retaining region.

37 Claims, 14 Drawing Sheets

(56) References Cited

U.S. PATENT DOCUMENTS

2014/0174630 A1    6/2014  Donnay et al.
2015/0090032 A1*  4/2015  Hedtke, Jr. .............. B26D 5/20
                                                                                        73/468

FOREIGN PATENT DOCUMENTS

| JP | 2003103497 A | | 4/2003 |
|---|---|---|---|
| JP | 2007107709 A | | 4/2007 |
| JP | 2007162861 A | | 6/2007 |
| JP | 2012511471 A | | 5/2012 |
| JP | 2012172735 A | | 9/2012 |
| KR | 102006002251 | | 3/2006 |
| KR | 100783928 B1 | | 12/2007 |
| KR | 20100061165 A | * | 6/2010 |
| KR | 102010006116 | | 6/2010 |

OTHER PUBLICATIONS

English translation of Chinese Office Action for Application No. 201780030289.3 dated Dec. 3, 2019.
International Search Report for International Application No. PCT/US2017/033070 dated Aug. 28, 2017.
Chinese Office Action for Application No. 201780030289.3 dated Aug. 4, 2020 (along with English translation).
Japanese Official Decision to Grant for Application 2018-560544 dated Jun. 29, 2020 along with English Translation.
Indian Examination Report for Application 201847042560 dated Jun. 25, 2020.

* cited by examiner

WEIGHT APPLICATOR HEAD PROVIDING IMPROVED WET OUT

CROSS REFERENCE TO RELATED APPLICATIONS

This U.S. patent application claims priority under 35 U.S.C. § 119(e) to U.S. Provisional Application No. 62/337,592, filed on May 17, 2016. The disclosures of this prior application is considered part of the disclosure of this application and is hereby incorporated by reference in its entirety.

TECHNICAL FIELD

This disclosure relates to a weight applicator for a wheel and more particularly to a weight applicator that improves wet out of the wheel balance weight during application.

BACKGROUND

Generally, a wheel and/or a wheel with a tire (wheel assembly) may have asymmetries of mass that cause imbalance during rotation. For example, these asymmetries may occur from manufacturing imperfections. Typically, to overcome asymmetries, a wheel or a wheel assembly is balanced by factories or repair shops to correct the asymmetries with wheel balance weights. By placing a wheel balance weight or a set of wheel balance weights at a determined position, the wheel balance weight balances the wheel or the wheel assembly and thereby prevents potential vibrational issues during use. Traditionally, wheel balancers placed the wheel balance weight on an outside lip of the wheel. These traditional weights were known as "bang-on" weights or "clip-on" weights because these weights included a clip or a clasp to secure the weight to the lip of the wheel. Due to the style and method of attaching these traditional weights, the weights were unsightly, easily dislodged, and the wheel could become damaged and lead to accelerated corrosion. As a means of combatting issues with traditional weights, wheel balancers began using adhesive wheel balance weights.

With any type of adhesive, the strength of the adhesion may vary depending on the application. For example, adhesives often fail to bond to surfaces with lower surface energy than the adhesive. The adhesive fails to bond because the surface energy prevents the adhesive from properly wetting or wetting-out. When an adhesive wets-out, the adhesive flows and covers a surface maximizing an adhesion contact area. Other potential issues affecting the wet-out of an adhesive may be the application pressure, the presence of air bubbles during application, or an improperly prepared surface. If the adhesion relating to a wheel balance weight fails to sufficiently bond to a surface of the wheel, the wheel balance weight may separate from the wheel during use. While known systems and methods of applying wheel balance weights to a wheel are in use currently, a continuous need for improvement in the relevant art remains.

SUMMARY

One aspect of the disclosure provides a weight applicator including a weight applicator head and at least one actuator. The weight applicator head is adapted to carry a wheel balance weight and has a weight application surface with a weight retaining region and a leading rotation region. The at least one actuator is coupled to the weight applicator head for manipulating the weight applicator head in at least one direction. The at least one direction has a radial component. The leading rotation region is oriented to extend radially further than the weight retaining region.

Implementations of the disclosure may include one or more of the following optional features. In some implementations, the weight applicator head manipulates the weight applicator head in at least two directions. The at least two directions may have a radial component and a rotational component. The weight applicator head may be configured to move between a weight receiving position and a weight applying position. At the weight applying position, the weight applicator head may be configured to transfer the wheel balance weight to an inner surface of a wheel. The weight application surface may have a radius of curvature less than a radius curvature of an inner surface of a wheel.

In some examples, the weight applicator includes a registration post configured to secure to a wheel disc of a wheel. The registration post may secure to the wheel disc at a center bore opening, having a registration shoulder disposed upon a hub mounting plate surrounding the center bore opening. The weight retaining region may have a weight retaining mechanism. The weight retaining mechanism may be at least one of an imbedded magnet, a recessed pocket, or a vacuum suction mechanism.

In some implementations, the weight applicator includes a controller configured to control the at least one actuator. The at least one actuator may be at least one of a radial actuator or a rotary actuator. The weight application may further include an applicator chassis connected to the weight applicator head, and configured to move in at least six degrees of freedom.

Another aspect of the disclosure provides a method for applying a wheel balance weight to a wheel. The method includes attaching a wheel balance weight to a weight applicator head and extending the weight applicator head toward a portion of the wheel such that only a portion of a leading edge of the wheel balance weight contacts the wheel. The method also includes rotating at least one of the wheel and the weight applicator head.

This aspect may include one or more of the following optional features. In some implementations, rotating at least one of the wheel and the weight applicator head includes rotating the weight applicator head in an arc with a different radius of curvature than the wheel. The method may also include laminating the wheel balance weight with a rotatable roller, the rotatable roller adjacent to a trailing edge of the wheel balance weight. The method may further include registering the weight applicator head to a wheel disc opening of the wheel. The method may also include controlling the weight applicator head with a controller.

In some examples, the method includes registering the weight applicator head to a wheel disc opening of the wheel and laminating the wheel balance weight with a rotatable roller. The rotatable roller may be adjacent to a trailing edge of the wheel balance weight. Attaching the wheel balance weight may include attaching the wheel balance weight by a weight retaining mechanism. The weight retaining mechanism may be at least one of an imbedded magnet, a recessed pocket, or a vacuum suction mechanism.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

Figure 1:
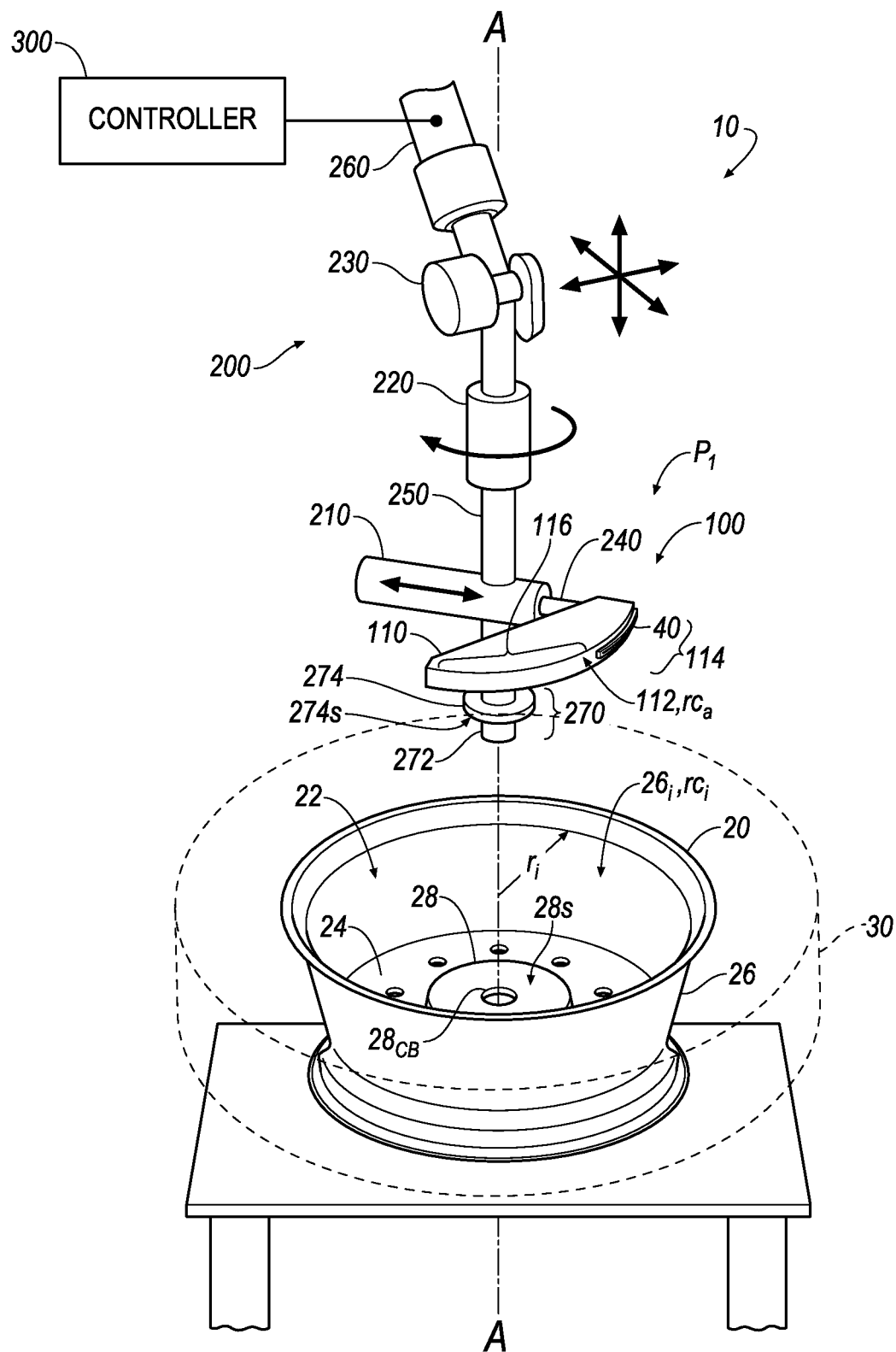
FIG. 1 is a perspective view of an example weight applicator environment.

FIG. 1 is an example of a weight applicator environment 10. The weight applicator environment 10 includes a wheel 20 or a wheel assembly with a wheel 20 and a tire 30 mounted upon the wheel 20. The wheel 20 has a shape that forms a wheel cavity 22 defined by a wheel disc 24 and a side wall 26. The side wall 26 has an inner surface $26_i$ with an inner surface radius $r_i$ corresponding to a radius of curvature $rc_i$. Towards a center of the wheel disc 24, the wheel disc 24 crests to a hub mounting plate 28 with a center bore $28_{CB}$. The center bore $28_{CB}$ is an opening that defines a center of the wheel 20.

The weight applicator environment 10 further includes a weight applicator 100, an applicator chassis 200, and a controller 300. The weight applicator 100 is configured to place a wheel balance weight 40 at a position on the inner surface $26_i$ of the side wall 26. The position of the wheel balance weight 40 depends on the imbalance of the wheel 20 and/or the wheel assembly 20, 30. A determination of the position and size of the wheel balance weight 40 occurs prior to or in conjunction with the weight applicator environment 10. For example, the wheel 20 and/or wheel assembly 20, 30 may be in a similar location or a similar staging area during wheel balancing and placing of the wheel balance weight 40 by the weight applicator 100. In other examples, the position of the wheel balance weight 40 may be pre-marked on the inner surface $26_i$ such that the weight applicator 100 aligns with the pre-marked position to place the wheel balance weight 40. The wheel balance weight 40 may be a weight tape cut to pieces of length or precut pieces of the discrete metallic weight material. The wheel balance weight 40 placed by the weight applicator 100 includes a wheel balance weight adhesive 42. The wheel balance weight adhesive 42 enables a weight balance material 44 such as steel, zinc, lead, or other metals (e.g., composite metals) to adhere to the inner surface $26_i$ of the side wall 26. The wheel balance weight adhesive 42 has adhesion strength to adhere to the inner surface $26_i$ of the wheel 20 when the wheel assembly 20, 30 rotates during operation of a vehicle.

The weight applicator 100 includes a weight applicator head 110 rigidly joined to the applicator chassis 200. The weight applicator head 110 has a weight application surface 112 with a radius of curvature $rc_a$. The radius of curvature $rc_a$ of the weight applicator head 110 may be less than, equal to, or greater than the radius of curvature $rc_i$ of the inner surface $26_i$ of the wheel 20. The weight application surface 112 has a weight retaining region 114 and a leading rotation region 116. The weight retaining region 114 is an area on the weight application surface 112 that retains the wheel balancing weight 40 in place prior to placement of the wheel balancing weight 40. In other words, the weight retaining region 1114 is adapted to carry the wheel balance weight 40. The weight retaining region 114 may retain the wheel balance weight 40 using any number of weight retaining mechanisms such as an imbedded magnet, a pressure fit (e.g., a recessed pocket), or vacuum suction (e.g., small opening with reverse air flow).

Referring further to FIG. 1, the applicator chassis 200 can be a robotic arm configured with six degrees of freedom controlled by the controller 300. The applicator chassis 200 includes at least one actuator 210, 220 and a chassis coupler 230. In some implementations, the at least one actuator is a radial actuator 210 and/or a rotary actuator 220. The radial actuator 210 actuates a radial actuator shaft 240 connected to the weight applicator 100 such that the weight applicator 100 moves between a weight receiving position $P_1$ (e.g., FIGS. 1-3A, 3D-4, 6A, 6G) and a weight applying position $P_2$ (e.g., FIGS. 3B-3C, 6C-6F). The weight applying position $P_2$ corresponds to a range of positions where at least a portion of the wheel balance weight 40, retained on the weight applicator 100, contacts the inner surface $26_i$ of the side wall 26. The weight receiving position $P_1$ is any position along a range of motion of the radial actuator shaft 240 other than the weight applying position $P_2$. In other words, the weight applicator 100 may receive the wheel balance weight 40 at any position other than the weight applying position $P_2$. An exception is when the weight applicator 100 is outside the wheel cavity 22 (as depicted in FIG. 1). In either position, the leading rotation region 116 may be oriented to extend radially further than the weight retaining region 114. This is because when the weight applicator 100 is outside (e.g., above) the wheel cavity 22, the radial actuator shaft 240 may be fully extended to a position without interfering with the side wall 26 of the wheel 20.

The rotary actuator 220 of the applicator chassis 200 is configured to rotate the weight applicator 100 about an axis A perpendicular to a surface $28_S$ of the hub mounting plate 28. With rotary motion of the weight applicator 100, the weight application surface 112 of the weight applicator head 110 tracks the inner surface $26_i$ of the wheel 20 such that the wheel balance weight 40 on the weight applicator 100 may be applied to the inner surface $26_i$ of the wheel 20 when the weight applicator 100 is in the weight applying position $P_2$. A rotary actuator shaft 250 connects the rotary actuator 220 to the weight applicator 100. In some examples, the rotary actuator shaft 250 connects to the radial actuator 210 such that rotation of the rotary actuator 220 permits the radial actuator 210 to simultaneously or to sequentially actuate.

The chassis coupler 230 is a joint, such as a universal joint, that permits the applicator chassis 200 to operate with six degrees of freedom. With the six degrees of freedom, the applicator chassis 200 has an ability to change positions in three perpendicular axes such as moving forward/backward, up/down (e.g., along axis A), or sway left/right, in combination with an ability to rotate about the three perpendicular axes (e.g., yaw, pitch, or roll). In some implementations, the chassis coupler 230 links the rotary actuator shaft 250 with a controller shaft 260.

The controller 300 is configured to operate at least the radial actuator 210 and the rotary actuator 220. In some examples, the controller 300 has a weight applicator module that includes a radial actuator movement control module and a rotary actuator movement control module. The weight applicator module controls and adjusts operating parameters of the radial actuator 210 (e.g., travel distance) and the rotary actuator 220 (e.g., degrees of rotation). Additionally or alternatively, the controller 300 may be configured with additional actuators that move the applicator chassis 200 in positions relating to the six degrees of freedom. For example, in some implementations, the applicator chassis 200 is manually positioned into the wheel cavity 22. Yet in other implementations, such as more automated wheel applicator environments 10, the controller 300 is configured to operate a linear actuator (not shown) that moves the applicator chassis 200 between positions along the axis A perpendicular to the hub mounting plate 28 such that the weight applicator head 110 may be positioned in the wheel cavity 22 where the wheel balance weight 40 will be placed.

During application of the wheel balance weight 40 to the wheel 20, the weight applicator 100 applies a force F from actuation of the radial actuator 210. The force F adheres a leading edge $40_{LE}$ (FIG. 3A) of the wheel balance weight 40 to the inner surface $26_i$ of the wheel 20. Subsequent to initial contact of the wheel balance weight 40 to the wheel 20, relative motion between the weight applicator head 110 and the inner surface $26_i$ of the wheel 20 continues transferring the wheel balance weight 40 to the wheel 20 until complete transfer. The relative motion between the weight applicator head 110 and the inner surface $26_i$ may be from rotational motion of the weight applicator 100, rotational motion of the wheel 20 from a rotation source (not shown), or some combination of both. To transfer the wheel balance weight 40, a shear strength of an adhesive bond between the wheel balance weight 40 and the inner surface $26_i$ is greater than a retaining force between the wheel balance weight 40 and the weight applicator head 110 (e.g., a magnetic force of the embedded magnet, a frictional of the pressure fit, or a suction force of the vacuum). The shear strength of the adhesive bond between the wheel balance weight 40 and the inner surface $26_i$ also may introduce an unwanted reciprocal force that could cause the wheel 20 or the weight applicator 100 to jerk or to slip (e.g., disrupt or disturb controlled motion from the applicator chassis 200). To reduce unwanted forces, the weight applicator environment 10 may control the movement of the wheel 20 relative to the applicator chassis 200 and the weight applicator 100. Some examples include interlocking the wheel 20 and the applicator chassis 200 such that frictional forces at the interlocking connection counteract forces at the application of the wheel balance weight 40. Additionally or alternatively, the applicator chassis 200 may have locking mechanism to prevent movement of the application chassis 200 during transfer of the wheel balance weight 40.

Figure 2:
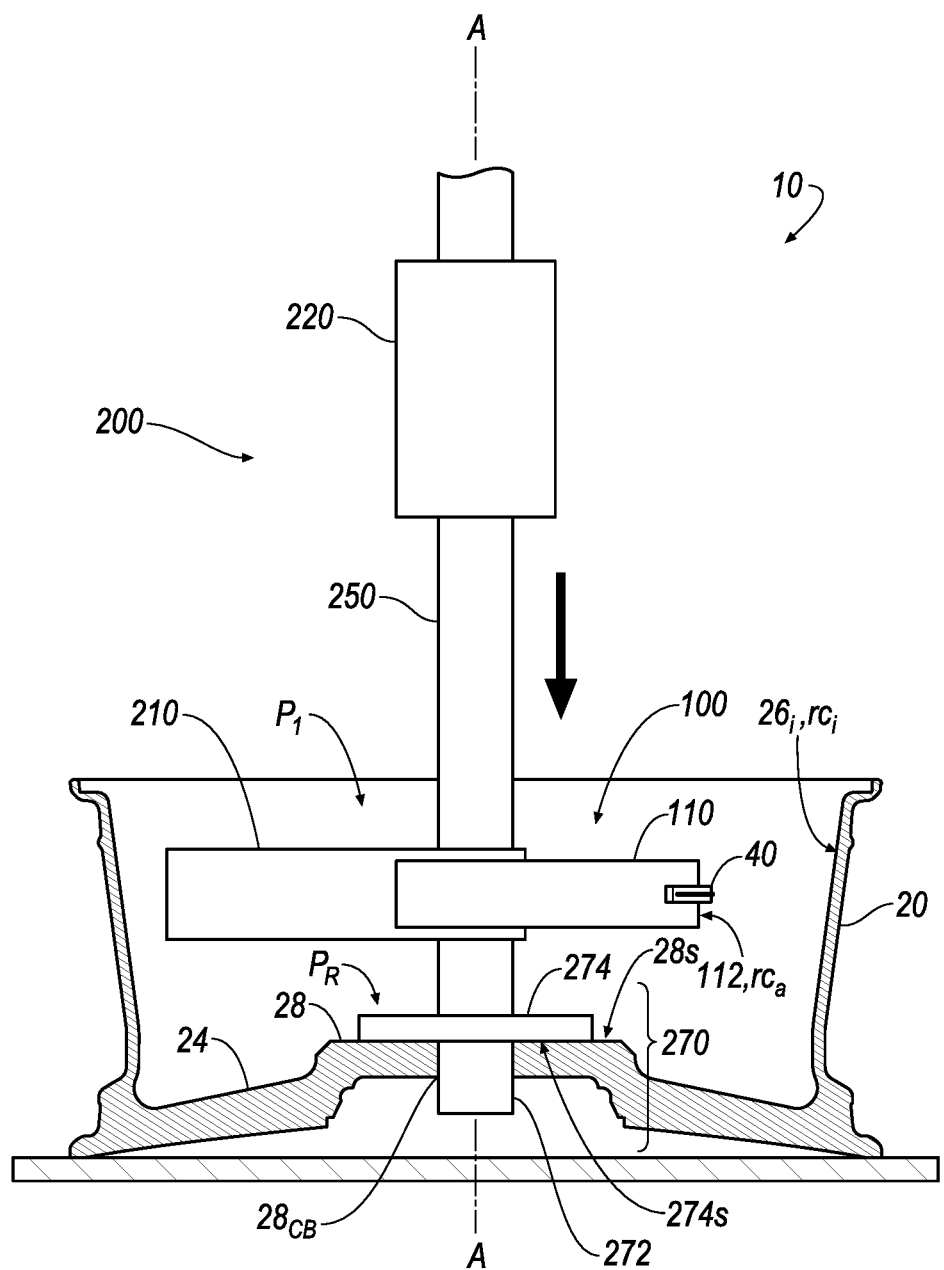
FIG. 2 is a side view of an example weight applicator environment with an applicator chassis engaged with a wheel.

With additional reference to FIG. 1 and FIG. 2, the applicator chassis 200 may optionally include a registration region 270. The registration region 270 may function to interlock the applicator chassis 200 with the wheel 20 (as discussed above) and/or align the weight applicator 100 in a position to place the wheel balance weight 40. In some examples, the registration region 270 includes a registration post 272 and a registration shoulder 274.

As illustrated in FIG. 2, the applicator chassis 200 translates along the axis A into a registration position $P_R$. The registration position $P_R$ is a position where the weight applicator 100 is in a plane parallel to the hub mounting plate 28 such that the wheel balance weight 40 is placed relatively perpendicular to the inner surface $26_i$ of the wheel 20. As an examples, FIG. 2 depicts a registration position $P_R$ where the registration region 270 mates with the hub mounting plate 28 of the wheel disc 24. In the registration position $P_R$, the registration post 272 travels through the center bore $28_{CB}$ until the registration shoulder 274 functions as a mechanical stop against a surface $28_S$ of the hub mounting plate 28. In some examples, as a mechanical stop, a registration shoulder engagement surface $274_S$ mates with the surface $28_S$ of the hub mounting plate 28. In other examples, the registration position $P_R$ is set by the controller 300 such that the controller 300 translates the applicator chassis 200 along the axis A and maintains the applicator chassis 200 in the registration position $P_R$. Alternatively, the applicator chassis 200 may be mechanically configured (e.g., set shaft lengths) that ensure the weight applicator 100 is in the registration position $P_R$.

Figure 3A:
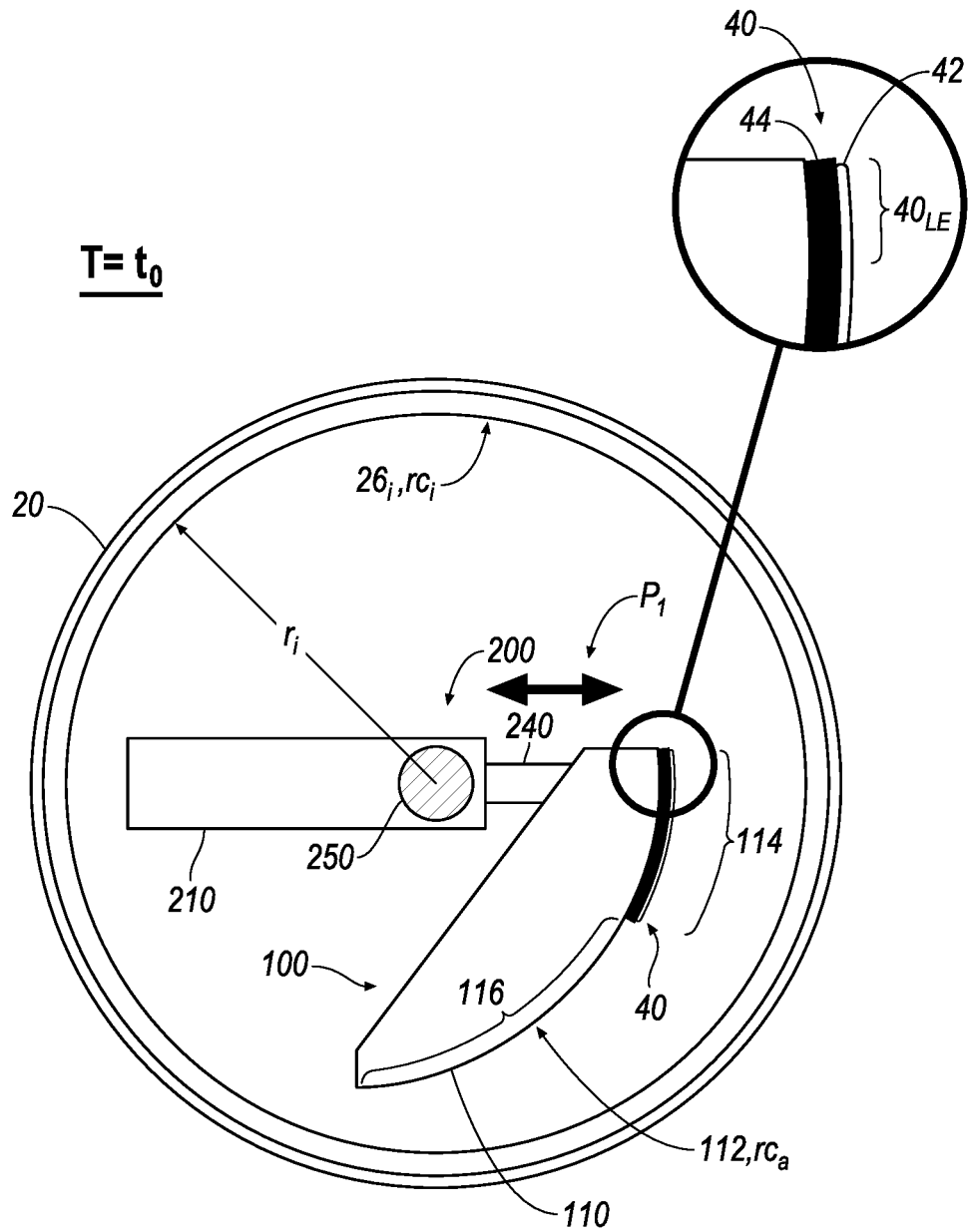
FIG. 3A is a top view of an example weight applicator environment with a weight applicator in a weight receiving position.

FIGS. 3A-3D are examples of a time sequence in the weight applicator environment 10 as the weight applicator 100 applies the wheel balance weight 40. FIG. 3A is an example of an initial period to of time T where the weight applicator 100 is within the wheel cavity 22 with the weight applicator head 110 in the weight receiving position $P_1$. FIG. 3A illustrates that the wheel balance weight adhesive 42 is an outermost layer of the wheel balance weight 40 such that the wheel balance weight adhesive 42 faces the inner surface $26_i$ of the wheel 20 and will contact the inner surface $26_i$ first. In other words, the wheel balance weight adhesive 42 is the outermost layer of the leading edge $40_{LE}$ of the wheel balance weight 40.

Figure 3B:
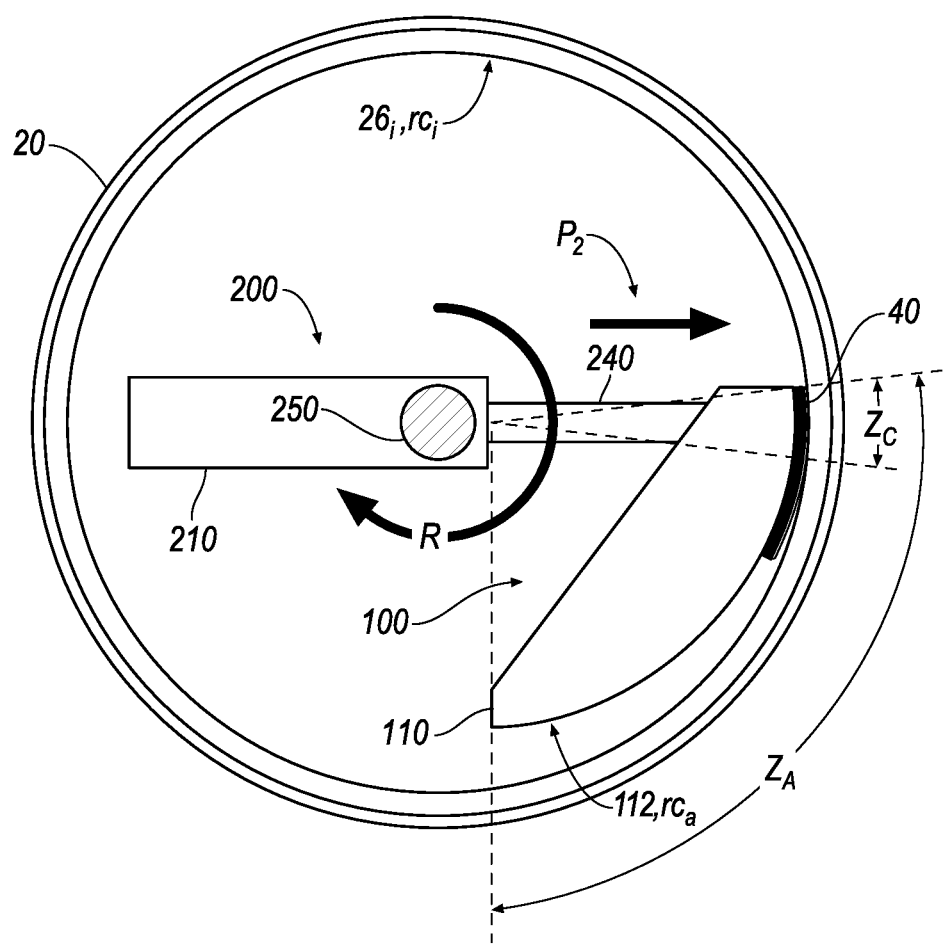
FIG. 3B is a top view of an example weight applicator environment with a weight applicator in a weight applying position at a first period of time.

FIG. 3B is an example of a first period $t_1$ of time T where the weight applicator 100 is within the wheel cavity 22 with the weight applicator head 110 in the weight applying position $P_2$. At the first period $t_1$ of time T, the radial actuator 210 has exerted a force F to extend the radial actuator shaft 240 and the connected weight applicator head 110. At the weight applying position $P_2$, the radial actuator 210 has provided the force F to apply the wheel balance weight 40 to an application contact zone $Z_C$. The application contact zone $Z_C$ corresponds to an area where the wheel balance weight adhesive 42 contacts the inner surface $26_i$ at the leading edge $40_{LE}$ in the weight applying position $P_2$. The application contact zone $Z_C$ is a portion of an application zone $Z_A$ corresponding to a region of travel of the weight applicator 100 during application of the wheel balance weight 40. The application zone $Z_A$ has an arc length proportional to an angle of rotation R of the rotary actuator 220 as the weight applicator 100 applies the wheel balance weight 40 to the wheel 20. As a ratio of the radius of curvature $rc_a$ of the weight application surface 112 to the radius of curvature $rc_i$ of the inner surface $26_i$ decreases, the application contact zone $Z_C$ diminishes from a tangent area where the weight application surface 112 of the weight applicator head 110 overlaps with the inner surface $26_i$ to a tangent point of contact between the weight application surface 112 and the inner surface $26_i$. Similarly, as the ratio decreases the force F will transition from a distributed force over a first area $A_1$ to a force over a second area $A_2$ where $A_1 > A_2$. Thus, the ratio of the radii of curvatures may help control wet out and lamination during the application of the wheel balance weight 40.

Figure 3C:
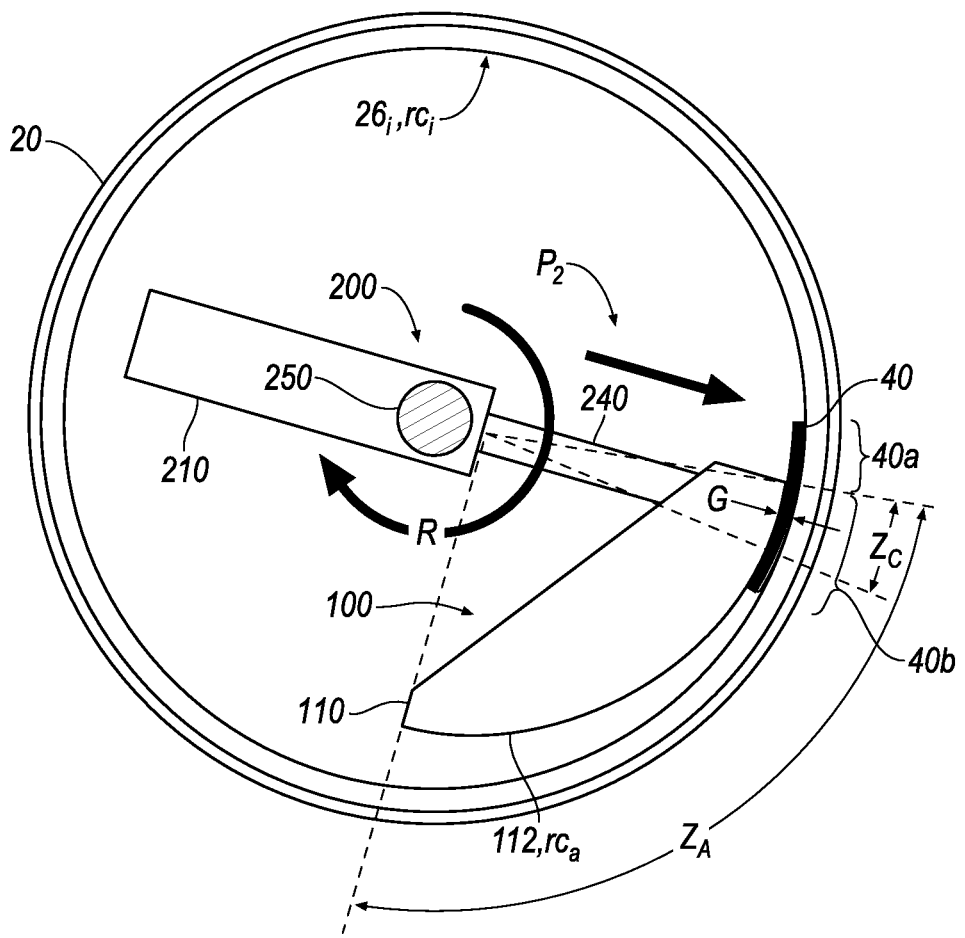
FIG. 3C is a top view of an example weight applicator environment with a weight applicator in a weight applying position at a second period of time.

FIG. 3C is an example of a second period $t_2$ of time T where the weight applicator 100 is within the wheel cavity 22 in the weight applying position $P_2$. At the second period $t_2$ of time T, the weight application surface 112 of the weight applicator head 110 has applied a first portion 40a of the wheel balance weight 40 to the inner surface $26_i$ of the wheel 20. As the weight applicator 100 rotates relative to the wheel 20, the weight application surface 112 at the second period $t_2$ is applying the force F at an application contact zone $Z_C$ corresponding to a second portion 40b of the wheel balance weight 40. As the weight applicator 100 transfers the application contact zone $Z_C$ to a different portion of the wheel balance weight 40, the relative rotational motion between the weight applicator 100 and the wheel 20 pulls the wheel balance weight 40 through a gap G between the weight application surface 112 and the inner surface $26_i$ of the wheel 20. The pull occurs due to the shear strength of the wheel balance weight adhesive 42. As the weight applicator 100 pulls the second portion 40b of the wheel balance weight 40 through the gap G, the gap G allows the weight application surface 112 to apply pressure and to adhere the second portion 40b of the wheel balance weight 40 to the inner surface $26_i$ at the application contact zone $Z_C$. In some examples, the width of the gap G may be substantially equal in width to the width of the wheel balance weight 40. In other examples, the width of the gap G may be smaller than the width of the wheel balance weight 40 to increase application pressure.

Figure 3D:
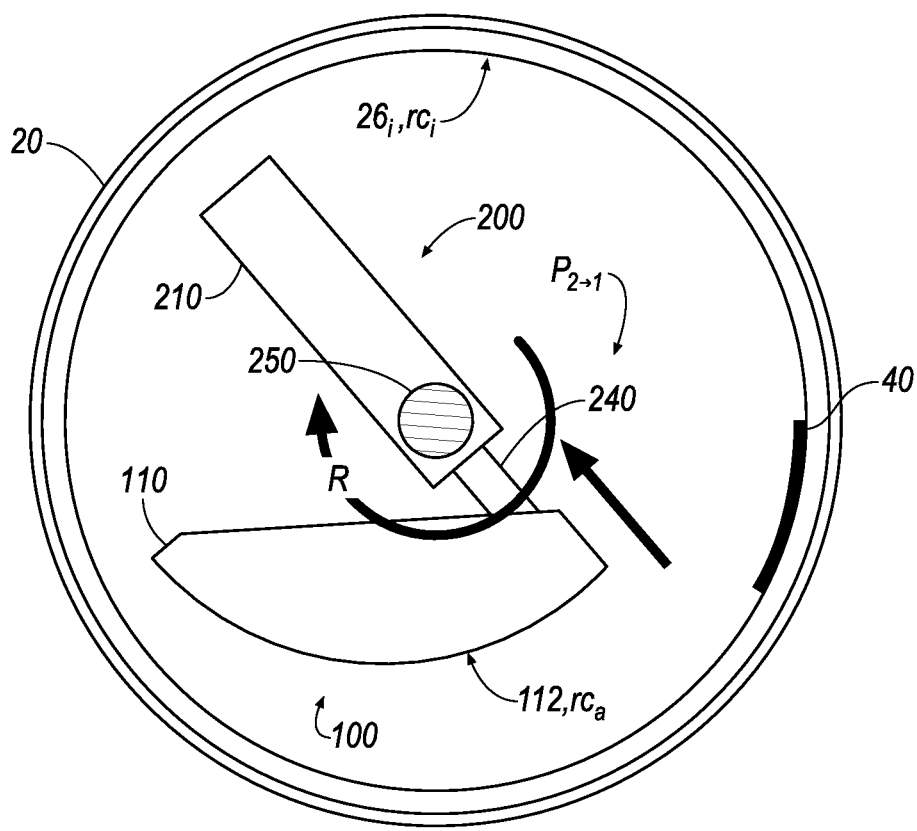
FIG. 3D is a top view of an example weight applicator environment with a weight applicator retracting from a weight applying position at a third period of time.

FIG. 3D is an example a third period $t_3$ of time T where the weight applicator 100 is within the wheel cavity 22 retracting from the weight applying position $P_2$ to the weight receiving position $P_1$. At the third period $t_3$ of time T, the weight applicator 100 has completed the relative rotation R to the wheel 20 and completely adhered the wheel balance weight 40 to the inner surface $26_i$ of the wheel 20. The weight applicator head 110 is retreating from the inner surface $26_i$ of the wheel 20.

Figure 4:
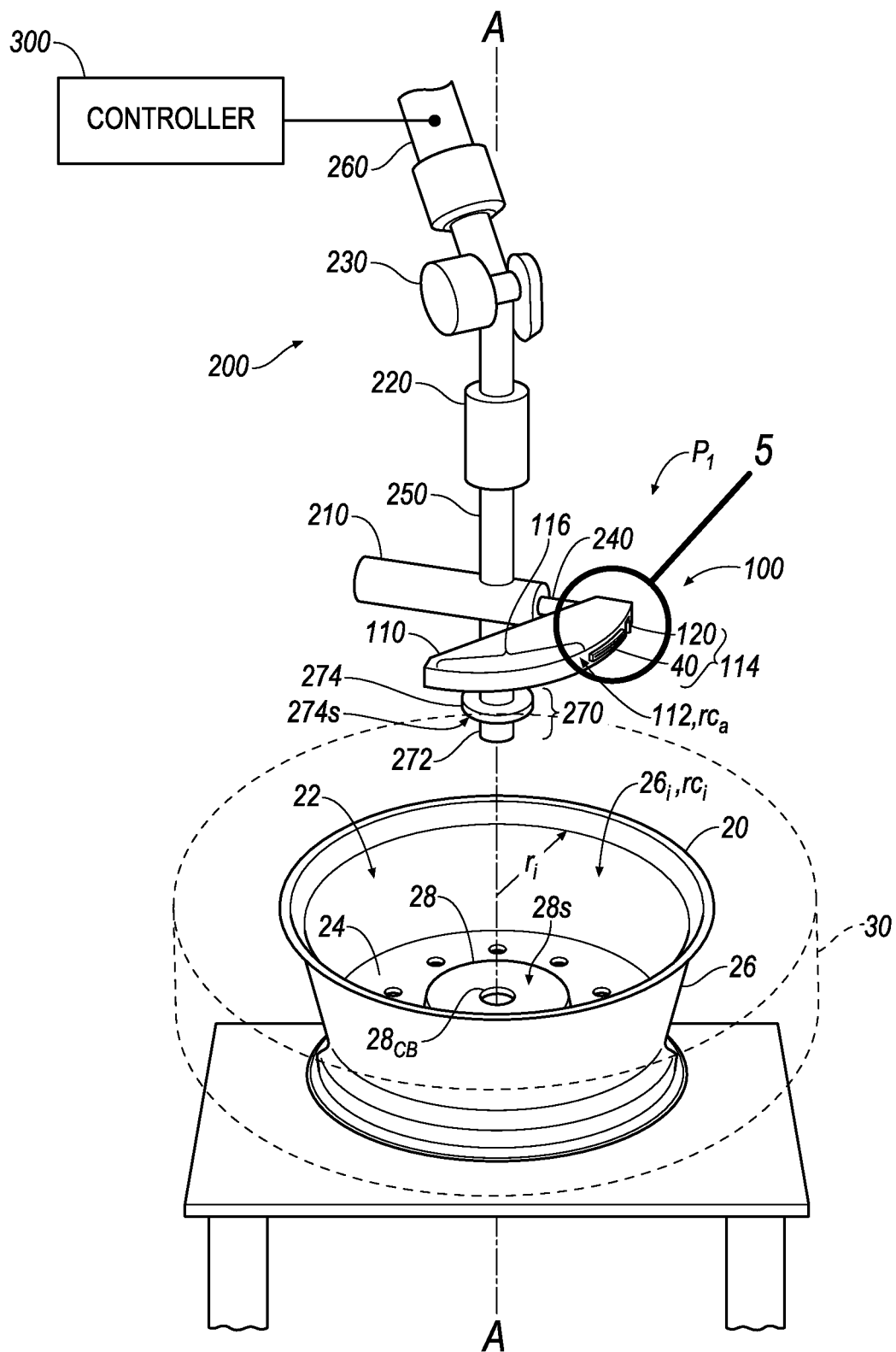
FIG. 4 is a perspective view of an example weight applicator environment.
Figure 5:
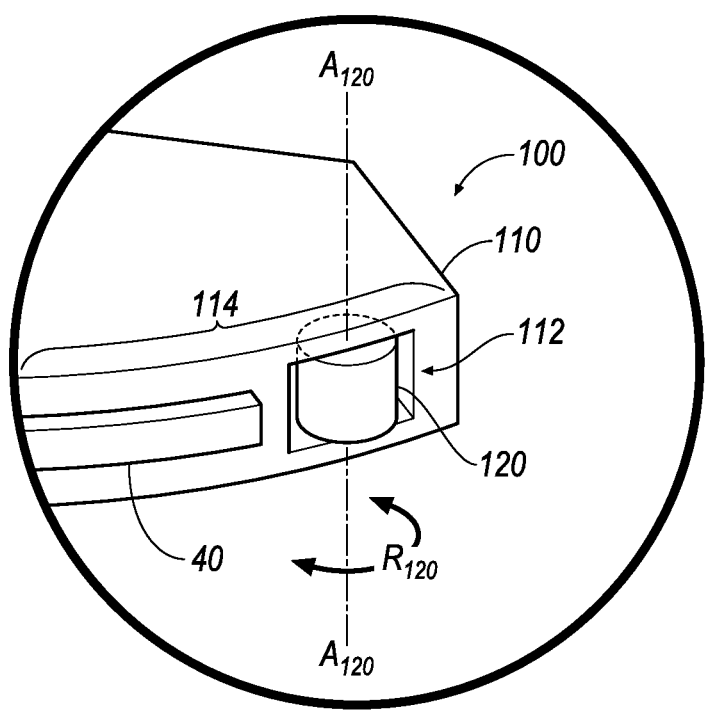
FIG. 5 is a perspective view of an example weight applicator head.

FIGS. 4-6 illustrate a weight applicator environment 10 that is similar to FIGS. 1-3 except that the weight applicator 100 includes a rotatable roller 120. As depicted by FIG. 5, the rotatable roller 120 rotates $R_{120}$ about an axis $A_{120}$ parallel to the weight application surface 112. In some examples, the rotatable roller 120 is within the weight retaining region 114 or adjacent to the weight retaining region 114 such that the rotatable roller 120 contacts and rolls over the wheel balance weight 40 as the wheel balance weight 40 transfers from the weight applicator 100 to the inner surface $26_i$ of the wheel 20. For example, the rotatable roller 120 is located at a trailing edge $40_{TE}$ of the wheel balance weight 40.

FIGS. 6A-6G, like FIGS. 3A-3D, are examples of a time sequence in the weight applicator environment 10 as the weight applicator 100 with the rotatable roller 120 applies the wheel balance weight 40. With reference to FIGS. 6A-6G, the structure and the function of the weight applicator 100 in the weight applicator environment 10 may be substantially similar to that of FIGS. 3A-3D apart from any exceptions described below and/or shown in the Figures. Accordingly the structure and/or the function of similar features will not be described again in detail and only the differences will be discussed hereafter.

Figure 6A:
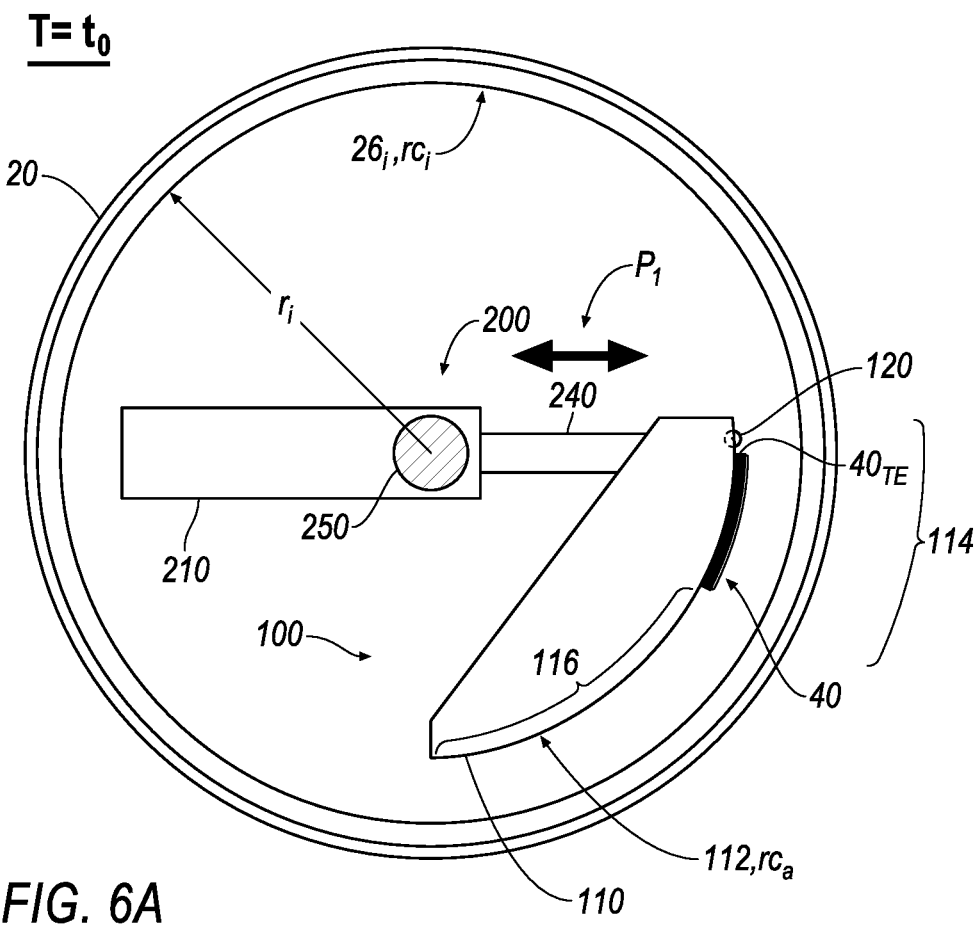
FIG. 6A is a top view of an example weight applicator environment with a weight applicator in a weight receiving position.
Figure 6B:
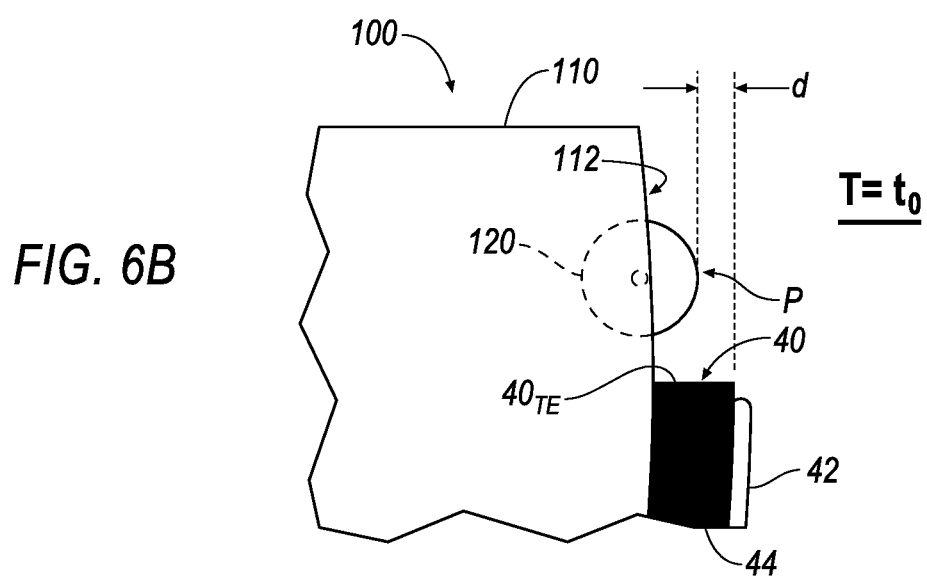
FIG. 6B is an enlarged view of the example weight applicator head of FIG. 6A.

FIGS. 6A-6B are examples of an initial period to of time T where the weight applicator 100 is within the wheel cavity 22 with the weight applicator head 110 in the weight receiving position $P_1$. The weight applicator head 110, as described in FIG. 5, includes the rotatable roller 120 adjacent to the trailing edge $40_{TE}$ of the wheel balance weight 40. As shown in FIG. 6B, the rotatable roller 120 protrudes P from the weight application surface 112 toward the inner surface $26_i$ of the wheel 20. In some examples, the protrusion P of the rotatable roller 120 offsets the rotatable roller 120 a distance d from the wheel balance weight adhesive 42. The distance d and/or the protrusion P are configured to permit the rotatable roller 120 to apply pressure to the wheel balance weight 40 as the weight applicator 100 applies the wheel balance weight 40 to the inner surface $26_i$ of the wheel 20.

Figure 6C:
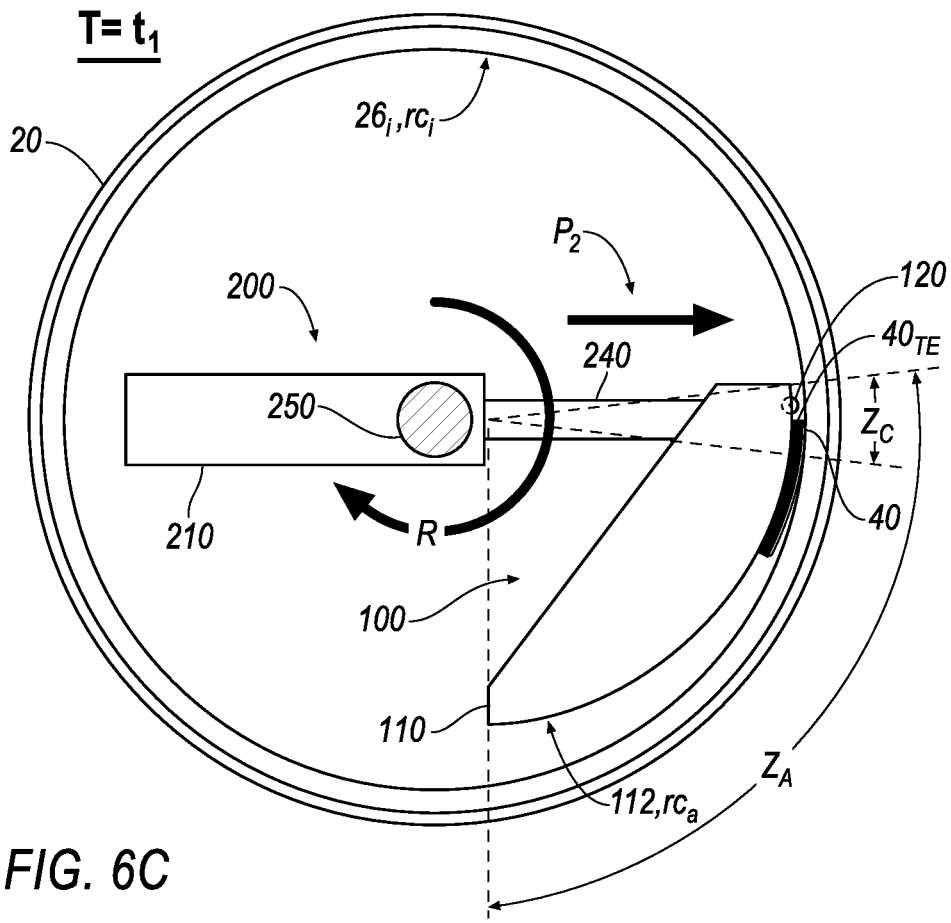
FIG. 6C is a top view of an example weight applicator environment with a weight applicator in a weight applying position at a first period of time.
Figure 6D:
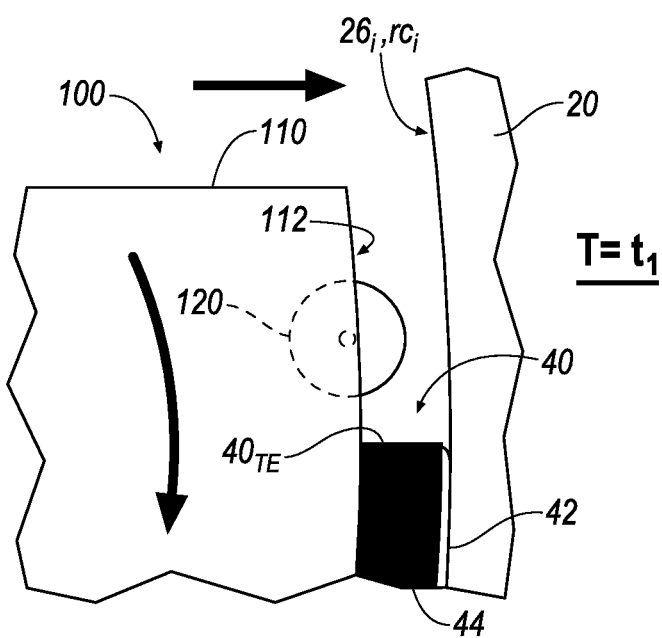
FIG. 6D is an enlarged view of the example weight applicator head of FIG. 6C.

FIGS. 6C-6D are examples of a first period $t_1$ of time T where the weight applicator 100 with the rotatable roller 120 is within the wheel cavity 22 with the weight applicator head 110 in the weight applying position $P_2$. At the first period $t_1$ of time T, the rotatable roller 120 is within the application contact zone $Z_C$, but has yet to contact the wheel balance weight 40. In these examples, the wheel balance weight 40 is first applied at the leading edge $40_{LE}$ to the inner surface $26_i$ of the wheel and then the rotatable roller 120 rolls over the wheel balance weight 40 after the weight applicator 100 rotates relative to the wheel through the application zone $Z_A$. In some examples, the rotatable roller 120 does not directly contact the inner surface $26_i$ of the wheel 20 as the wheel balance weight 40 is applied.

Figure 6E:
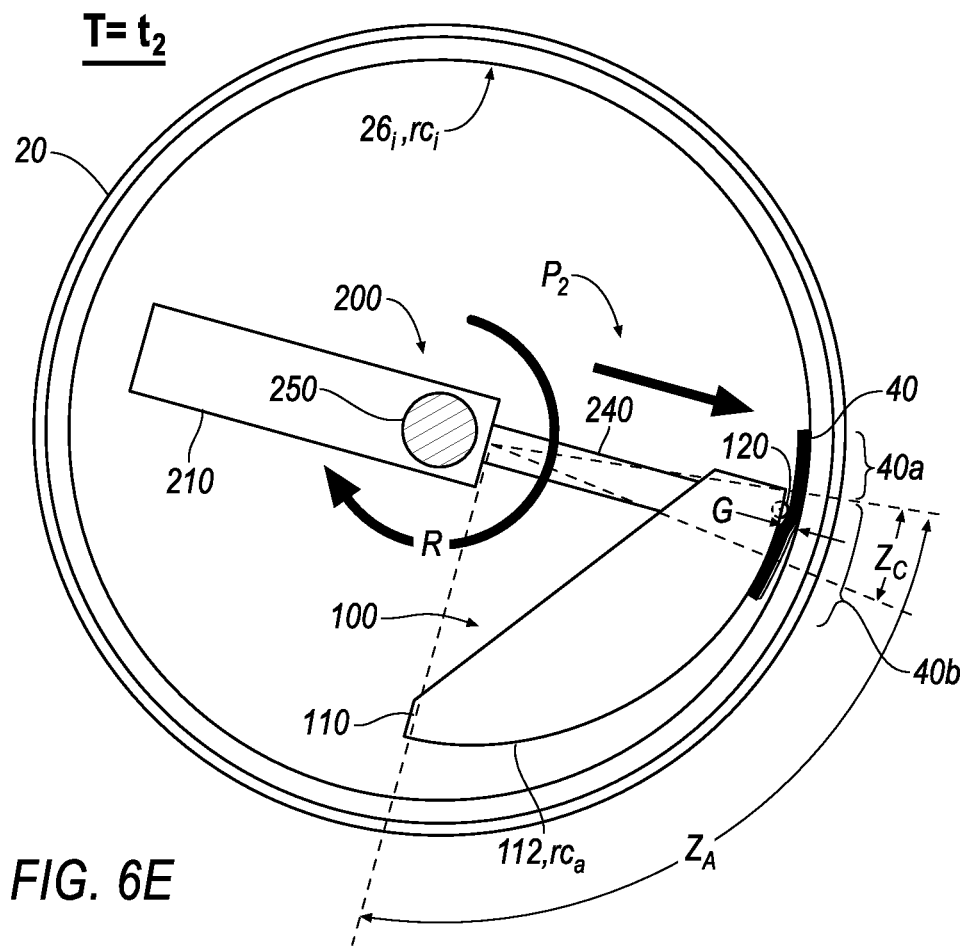
FIG. 6E is a top view of an example weight applicator environment with a weight applicator in a weight applying position at a second period of time.
Figure 6F:
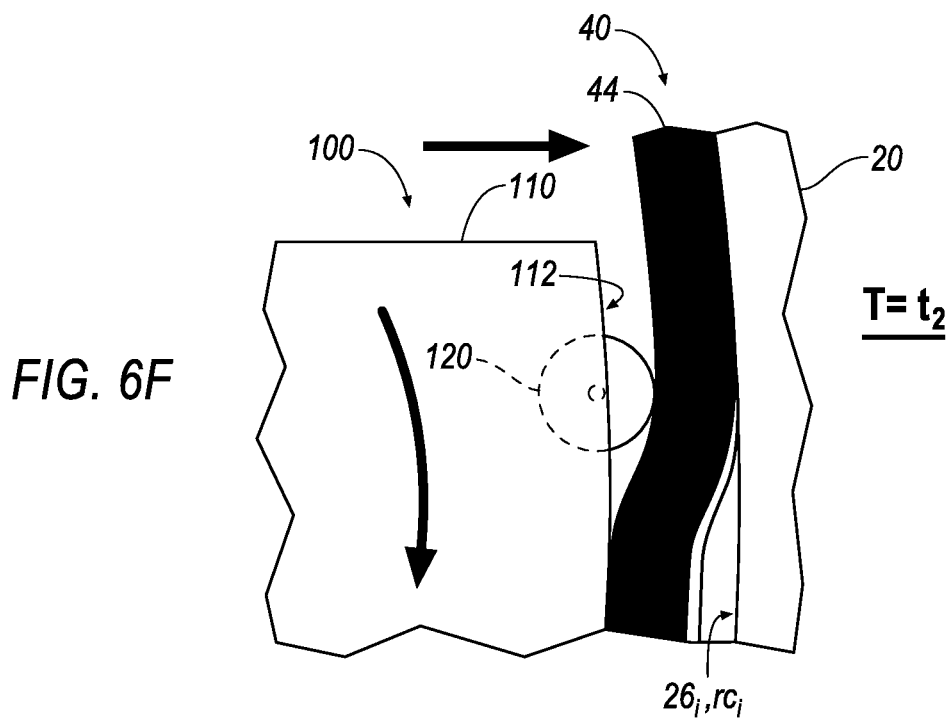
FIG. 6F is an enlarged view of the example weight applicator head of FIG. 6E.
Figure 6G:
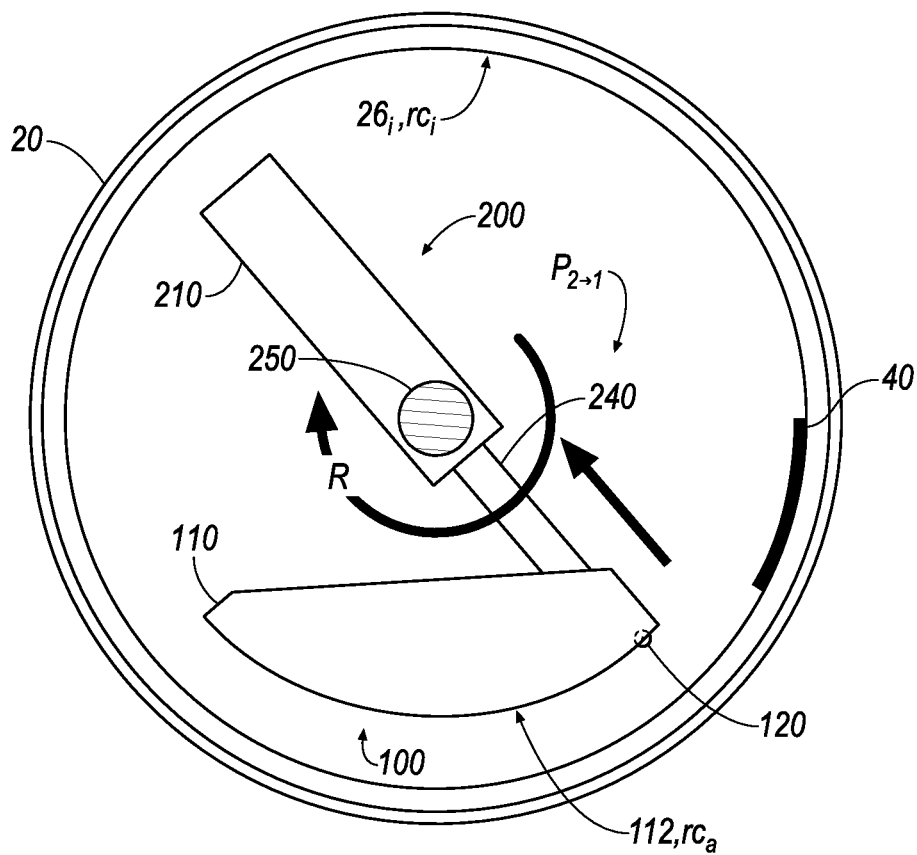
FIG. 6G is a top view of an example weight applicator environment with a weight applicator retracting from the weight applying position at a third period of time.

FIGS. 6E-6F are examples of a second period $t_2$ of time T where the weight applicator 100 with the rotatable roller 120 is within the wheel cavity 22 in the weight applying position $P_2$. At the second period $t_2$ of time T, the rotatable roller 120 applies pressure to the wheel balance weight 40. In some examples, the weight applicator 100 with the addition of the rotatable roller 120 applies more pressure to the wheel balance weight 40 because the protrusion P of the rotatable roller 120 decreases the gap G that the wheel balance weight 40 is pulled through during application to the inner surface $26_i$. Additionally or alternatively, the weight applicator 100 may be constructed such that, at the weight applying position $P_2$, the rotatable roller 120 functions as the main means of applying the wheel balance weight 120 instead of in combination with the weight application surface 112 or solely the weight application surface 112 (e.g., FIGS. 3A-3D). For example, the rotatable roller 120 may provide uniform pressure to the wheel balance weight 40 during application. Uniform pressure and/or increased pressure may improve the wet-out of the wheel balance weight adhesive 42 and thus provide improved adhesion to wheel 20.

Figure 7:
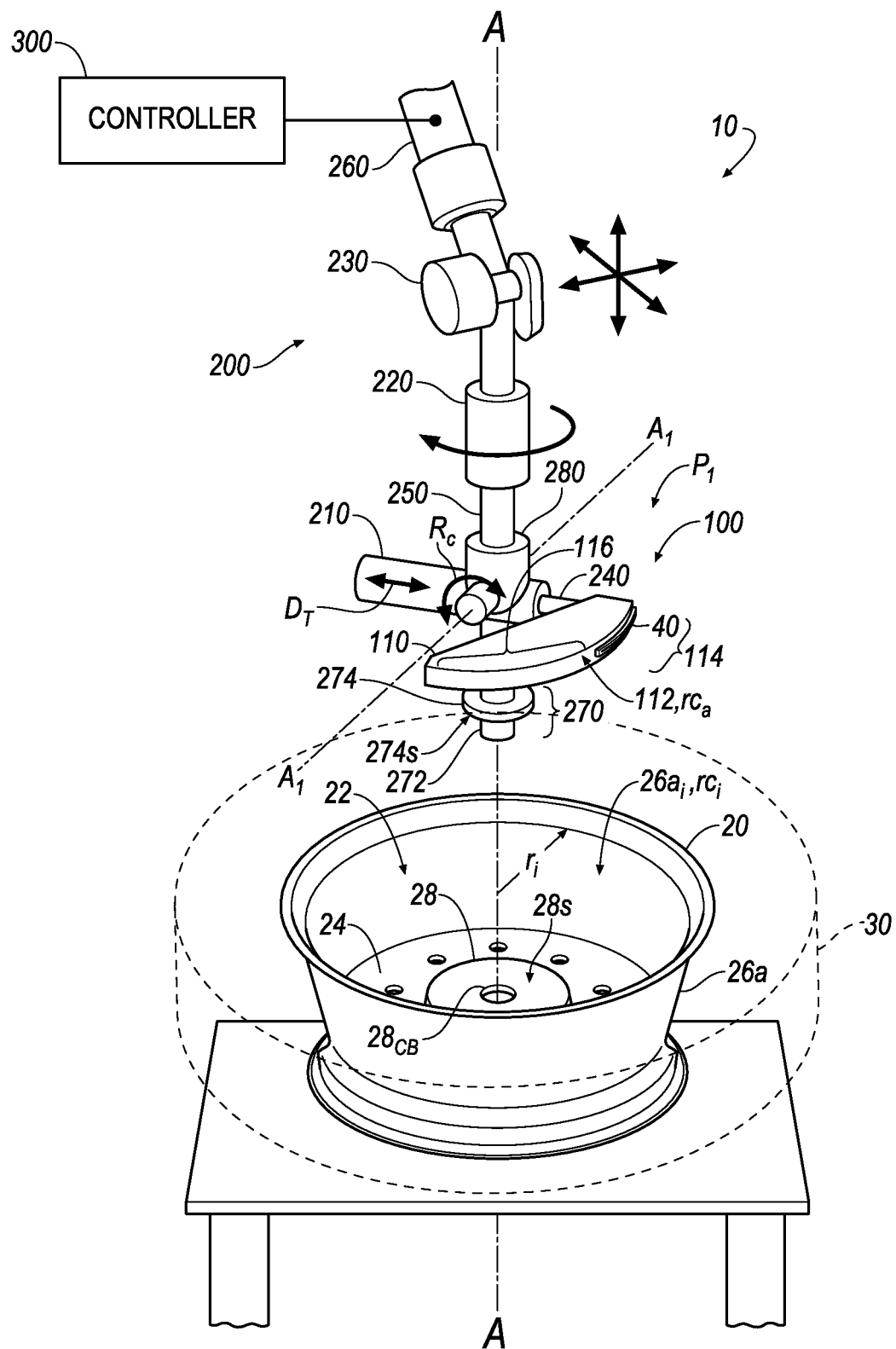
FIG. 7 is a perspective view of an example weight applicator environment.

FIG. 7 is an example of a weight applicator environment 10. The weight applicator environment 10 includes a weight applicator 100 configured to apply the wheel balance weight 40 to a wheel 20 with a conical inner surface $26a_i$ of a side wall 26a. The conical inner surface $26a_i$ may slope in a direction towards the axis A or away from the axis A. To apply the wheel balance weight 40 to the conical inner surface 26$a_i$, at least one actuator (e.g., 280) is configured to rotate R$_C$ about an axis A$_1$ perpendicular to the axis A. As shown in FIG. 7, the axis A$_1$ may be parallel to the hub mounting plate 28 and perpendicular to a direction of travel D$_T$ of the weight applicator 100 as the weight applicator head 110 moves between the weight receiving position P$_1$ and the weight applying position P$_2$. The at least one actuator may be the same as the radial actuator 210 (e.g., 280 as shown in FIG. 7), the same as the rotary actuator 220, or an additional actuator of the applicator chassis 200. Additionally or alternatively, the actuator 280 may be located in the weight applicator head 110 or at a weight applicator head end of the radial actuator shaft 240. In any case, the controller 300 may be configured to operate the actuator 280. By rotating R$_C$ about the axis A$_1$, the actuator 280 pivots the weight applicator 100 such that at least a portion of the weight application surface 112 of the weight applicator head 110 tracks (i.e. is generally parallel to) at least a portion of the conical inner surface 26$a_i$ of the wheel 20 as the weight applicator 100 applies the wheel balance weight 40 in the weight applying position P$_2$. In some examples, the weight applicator environment 10 as shown by FIG. 7 may include a rotatable roller 120 as described above.

Figure 8:
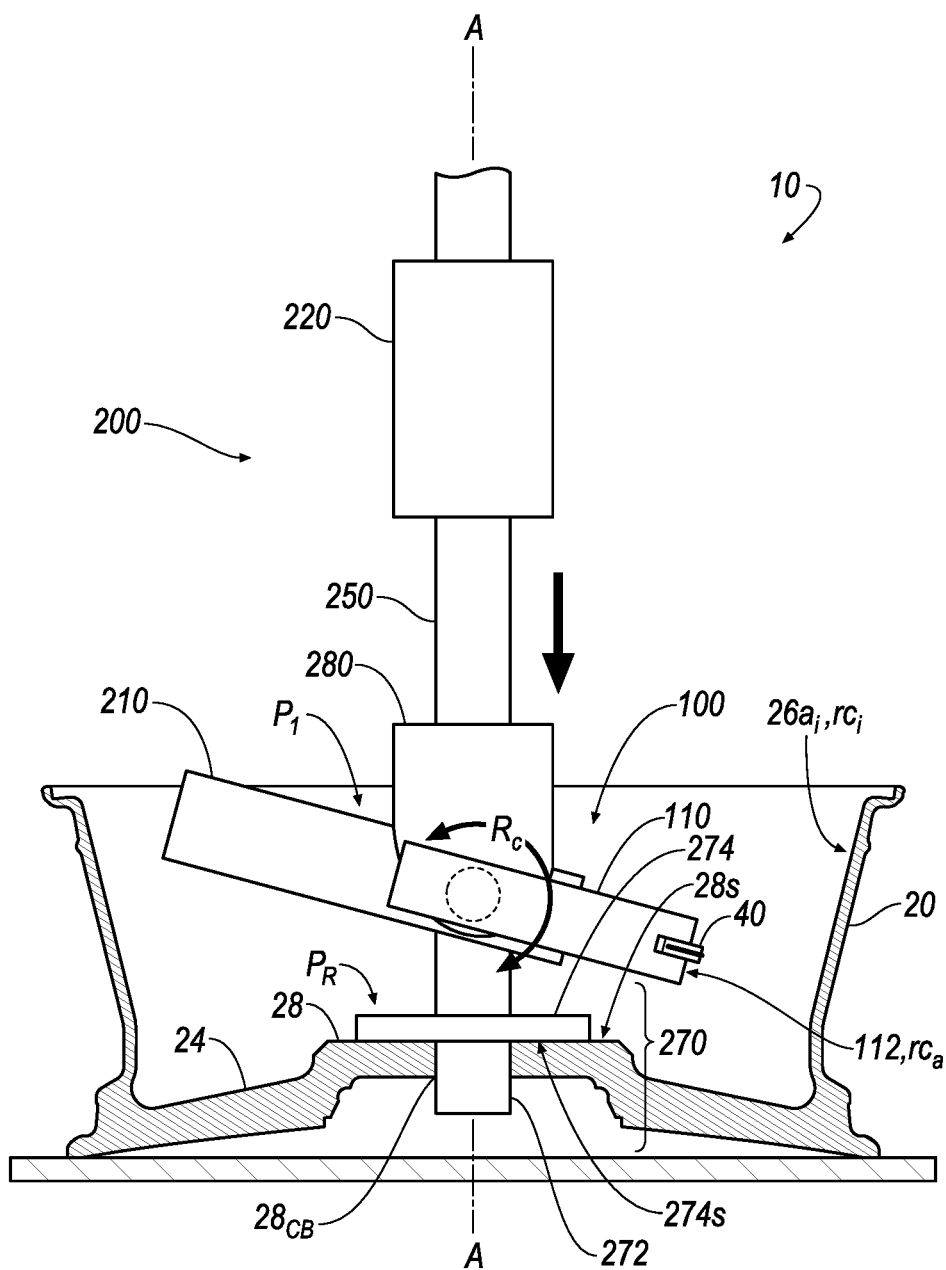
FIG. 8 is a side view of the example weight applicator environment of FIG. 7 engaged with a wheel.

FIG. 8 is a side view of the example weight applicator environment 10 of FIG. 7 within the wheel 20. The weight applicator 100 includes at least one actuator (e.g., 280) is configured to rotate R$_c$ about an axis A$_1$ perpendicular to the axis A. The at least one actuator 280 may rotate R$_c$ to adjust a pitch or an angle of the weight applicator head 110 such that the wheel balance weight 40 is placed relatively perpendicular to the conical inner surface 26$a_i$ of the wheel 20. By placing the wheel balance weight 40 relatively perpendicular to the conical inner surface 26$a_i$, the wheel balance weight 40 is more likely to adhere and to improve wet-out.

A number of actuators have been described herein for use with various embodiments. Although these actuators could be manually or automatically activated, it is envisioned that the greatest utility would be obtained by activating the actuators programmatically by one or more controllers operating under electronic program control (such as a P.L.C., general purpose digital computer, analog controller, etc.).

A number of implementations have been described. Nevertheless, it will be understood that various modifications may be made without departing from the spirit and scope of the disclosure. Accordingly, other implementations are within the scope of the following claims.

What is claimed is:

1. A portion of a weight applicator that is configured to apply a wheel balance weight to an inner surface of a wheel, the portion of the weight applicator comprising:
   a weight applicator head configured for rotation about an axis of rotation and moveable between a retracted weight-receiving position and an extended weight-applying position, the weight applicator head including a weight application surface extending from a first edge to a second edge spaced from the first edge, wherein the weight application surface is defined by:
      a weight retaining region extending to the first edge; and
      a leading rotation region extending to the second edge;
   wherein the weight retaining region of the weight application surface is configured for arrangement opposite the inner surface of the wheel at a first distance extending from the axis of rotation,
   wherein the leading rotation region of the weight application surface is configured for arrangement opposite the inner surface of the wheel at a second distance extending from the axis of rotation,
   wherein, when the weight applicator head is arranged in the retracted weight-receiving position, the second distance is greater than the first distance.

2. The portion of the weight applicator of claim 1, further comprising:
   at least one actuator coupled to the weight applicator head, wherein the at least one actuator manipulates the weight applicator head in at least two directions including a radial component and a rotational component.

3. The portion of the weight applicator of claim 1, wherein the weight applicator head is configured to move between a weight receiving position and a weight applying position.

4. The portion of the weight applicator of claim 3, wherein, at the weight applying position, the weight applicator head is configured to transfer the wheel balance weight to the inner surface of the wheel.

5. The portion of the weight applicator of claim 4, wherein the weight applicator head is configured to perpendicularly transfer the wheel balance weight to the inner surface of the wheel.

6. The portion of the weight applicator of claim 4, wherein the inner surface of the wheel is defined by a conical inner surface, wherein, at the weight applying position, the weight applicator head is rotatably-configurable for arrangement at an angle that is orthogonal to the conical inner surface of the wheel for transferring the wheel balance weight to the conical inner surface of the wheel.

7. The portion of the weight applicator of claim 1, wherein the weight application surface is defined by a first radius of curvature that is less than a second radius of curvature defined by the inner surface of the wheel.

8. The portion of the weight applicator of claim 1, further comprising:
   a registration post configured to secure to a wheel disc of the wheel.

9. The portion of the weight applicator of claim 8, wherein the registration post is secured to the wheel disc at a center bore opening, wherein the registration post includes a registration shoulder disposed upon a hub mounting plate surrounding the center bore opening.

10. The portion of the weight applicator of claim 1, wherein the weight retaining region has a weight retaining mechanism.

11. The portion of the weight applicator of claim 10, wherein the weight retaining mechanism is at least one of an imbedded magnet, a recessed pocket, or a vacuum suction mechanism.

12. The portion of the weight applicator of claim 1, further comprising:
   a rotatable roller arranged within the weight retaining region, wherein the rotatable roller protrudes from the weight application surface and is operable to roll in at least one direction with the weight applicator head.

13. The portion of the weight applicator of claim 2, further comprising:
   a controller configured to control the at least one actuator.

14. The portion of the weight applicator of claim 13, wherein the at least one actuator is at least one of a radial actuator or a rotary actuator.

15. The portion of the weight applicator of claim 1, further comprising:
   an applicator chassis connected to the weight applicator head, wherein the applicator chassis is configured to move in at least six degrees of freedom.

16. A method for applying a wheel balance weight to an inner surface of a wheel, the method comprising:
attaching the wheel balance weight to a weight application surface of a weight applicator head that is arranged in a retracted weight-receiving position relative to an axis of rotation, the weight application surface extending from a first edge to a second edge spaced from the first edge, wherein the wheel balance weight is attached to a weight retaining region of the weight application surface, wherein the weight retaining region of the weight application surface extends to the first edge and is configured for arrangement opposite the inner surface of the wheel at a first distance extending from the axis of rotation, wherein a leading rotation region of the weight application surface is configured for arrangement opposite the inner surface of the wheel at a second distance extending from the axis of rotation, wherein the second distance is greater than the first distance;
extending the weight applicator head toward the inner surface of the wheel such that only a portion of a leading edge of the wheel balance weight contacts the inner surface of the wheel; and
rotating at least one of the wheel and the weight applicator head.

17. The method of claim 16, wherein rotating at least one of the wheel and the weight applicator head includes:
rotating the weight applicator head along an arcuate path defined by a first radius of curvature that is different from a second radius of curvature defined by the inner surface of the wheel.

18. The method of claim 16, further comprising:
laminating the wheel balance weight with a rotatable roller extending from the weight application surface of the weight applicator head, wherein the rotatable roller is arranged adjacent to a trailing edge of the wheel balance weight.

19. The method of claim 16, further comprising:
registering the weight applicator head within a wheel disc opening of the wheel.

20. The method of claim 16, further comprising:
controlling the weight applicator head with a controller.

21. The method of claim 16, wherein attaching the wheel balance weight includes:
securing the wheel balance weight with a weight retaining mechanism.

22. The method of claim 21, wherein the weight retaining mechanism is at least one of an imbedded magnet, a recessed pocket, or a vacuum suction mechanism.

23. The method of claim 16, further comprising:
rotatably-positioning the weight applicator head at an angle for arranging the wheel balance weight perpendicular to the inner surface of the wheel.

24. A portion of a weight applicator that is configured to apply a wheel balance weight to an inner surface of a wheel defined by a wheel inner surface radius of curvature, the portion of the weight applicator comprising:
a weight applicator head configured for rotation about an axis of rotation and for being arrangeable in one of a retracted weight-receiving position and an extended weight-applying position, wherein the weight applicator head includes a weight application surface extending from a leading edge to a trailing edge spaced from the leading edge,
wherein the weight application surface is defined by:
a weight retaining region extending from the axis of rotation at a first radius; and
a leading rotation region extending from the axis of rotation at a second radius,
wherein a weight application surface radius of curvature is less than the wheel inner surface radius of curvature; and
at least one actuator coupled to the weight applicator head,
wherein:
when the weight applicator head is arranged in the retracted weight-receiving position, the second radius is greater than the first radius; and
when the weight applicator head is arranged in the extended weight-applying position, the second radius is less than the first radius.

25. The portion of the weight applicator of claim 24, wherein the at least one actuator manipulates the weight applicator head in at least two directions including a radial component and a rotational component.

26. The portion of the weight applicator of claim 25, further comprising:
a controller configured to control the at least one actuator.

27. The portion of the weight applicator of claim 24, wherein the weight retaining region includes a weight retaining mechanism.

28. The portion of the weight applicator of claim 27, wherein the weight retaining mechanism is at least one of an imbedded magnet, a recessed pocket, or a vacuum suction mechanism.

29. The portion of the weight applicator of claim 28, wherein the at least one actuator is at least one of a radial actuator or a rotary actuator.

30. The portion of the weight applicator of claim 24, further comprising:
a rotatable roller arranged within the weight retaining region, wherein the rotatable roller protrudes from the weight application surface and is operable to roll in at least one direction with the weight applicator head.

31. The portion of the weight applicator of claim 24, further comprising:
an applicator chassis connected to the weight applicator head, wherein the applicator chassis is configured to move in at least six degrees of freedom.

32. A portion of a weight applicator that is configured to apply a wheel balance weight to an inner surface of a wheel, the portion of the weight applicator comprising:
an applicator head configured for rotation about an axis of rotation and moveable between a retracted weight-receiving position and an extended weight-applying position, wherein the applicator head includes:
an arcuate weight application surface;
a linear trailing surface having a first end that extends from a first end of the arcuate weight application surface that defines a weight retaining region extending from the axis of rotation at a first distance;
a linear leading surface having a first end that extends from a second end of the arcuate weight application surface that defines a leading rotation region extending from the axis of rotation at a second distance; and
a linear rear surface opposite the arcuate weight application surface, wherein a second end of the linear trailing surface extends from a first end of the linear rear surface, wherein a second end of the linear leading surface extends from a second end of the linear rear surface; and
a radial actuator shaft extending from the linear rear surface, wherein, when the applicator head is arranged in the retracted weight-receiving position, the first distance is less than the second distance.

33. The portion of a weight applicator of claim 32, wherein the radial actuator shaft is arranged closer to the linear trailing surface than the linear leading surface.

34. A method for applying a wheel balance weight including wheel balance weight adhesive to an inner surface of a wheel, the method comprising:
providing a wheel defined by a wheel inner surface radius of curvature;
providing a weight applicator head configured for rotation about an axis of rotation and for being moveable between a retracted weight-receiving position and an extended weight-applying position, wherein the weight applicator head includes having a weight application surface extending from a leading edge to a trailing edge spaced from the leading edge, the weight application surface being defined by:
a weight retaining region extending from the axis of rotation at a first radius; and
a leading rotation region extending from the axis of rotation at a second radius,
wherein the first radius is less than the wheel inner surface radius of curvature;
removably-securing the wheel balance weight to the weight application surface of the weight applicator head;
actuating a radial actuator for moving the weight applicator head toward the inner surface of the wheel in the extended weight-applying position for disposing, with a radial force, the wheel balance weight adhesive of the wheel balance weight upon an application contact zone of the inner surface of the wheel, the radial actuator being coupled to the weight applicator head; and
actuating a rotary actuator for rotating the weight applicator head for applying the wheel balance weight adhesive of wheel balance weight to the application contact zone of the inner surface of the wheel,
wherein the application contact zone of the inner surface of the wheel is a portion of an application zone of the inner surface of the wheel that corresponds to a rotational region of travel of the weight applicator head, wherein the application zone is defined by an arc length proportional to an angle of rotation of the rotary actuator as the weight applicator head applies the wheel balance weight adhesive of the wheel balance weight to the inner surface of the wheel, wherein, as a ratio of the first radius to the wheel inner surface radius of curvature decreases, the application contact zone diminishes from a tangent area where the weight application surface of the weight applicator head overlaps with the inner surface of the wheel to a tangent point of contact between the weight application surface and the inner surface of the wheel,
wherein, when the weight applicator head is arranged in the retracted weight-receiving position, the second radius is greater than the first radius.

35. The method of claim 34, wherein, as the ratio of the first radius to the wheel inner surface radius of curvature decreases, the radial force transitions from a first distributed force over a first area to a second distributed force over a second area that is less than the first area.

36. The method of claim 35, wherein the ratio of the first radius and the wheel inner surface radius of curvature controls wet out and lamination of the wheel balance weight adhesive of the wheel balance weight during the application of the wheel balance weight adhesive of the wheel balance weight to the inner surface of the wheel.

37. A method for applying a wheel balance weight to a conical inner surface of a wheel, the method comprising:
axially disposing a weight applicator head within a conical cavity of the wheel, the weight applicator head extending from a leading edge to a trailing edge spaced from the leading edge and including (i) a weight application surface having a weight retaining region extending from an axis of rotation at a first distance and (ii) a leading rotation region extending from the axis of rotation at a second distance, wherein the cavity is defined by the conical inner surface of the wheel;
radially arranging the weight applicator head at a retracted weight applying position;
rotatably-adjusting an orientation of the weight applicator head about the axis of rotation for arranging the weight applicator head at an angle that is orthogonal to the conical inner surface of the wheel; and
actuating a radial actuator for radially moving the weight applicator head from the retracted weight applying position to an extended weight applying position in a direction toward the conical inner surface of the wheel for disposing, with a radial force, the wheel balance weight upon the conical inner surface of the wheel, wherein, when the weight applicator head is arranged in the retracted weight applying position, the second distance is greater than the first distance.

* * * * *